(12) United States Patent
Chen et al.

(10) Patent No.: US 7,454,576 B2
(45) Date of Patent: Nov. 18, 2008

(54) SYSTEM AND METHOD FOR CACHE COHERENCY IN A CACHE WITH DIFFERENT CACHE LOCATION LENGTHS

(75) Inventors: Yen-Kuang Chen, Cupertino, CA (US); Christopher J. Hughes, San Jose, CA (US); James M. Tuck, III, Savoy, IL (US)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 11/024,278

(22) Filed: Dec. 27, 2004

(65) Prior Publication Data

US 2006/0143404 A1 Jun. 29, 2006

(51) Int. Cl.
*G06F 12/00* (2006.01)

(52) U.S. Cl. .................. 711/141; 707/201; 710/107

(58) Field of Classification Search .................. 711/141
See application file for complete search history.

(56) References Cited

U.S. PATENT DOCUMENTS

| | | | |
|---|---|---|---|
| 5,996,048 A * | 11/1999 | Cherabuddi et al. | 711/122 |
| 6,260,114 B1 * | 7/2001 | Schug | 711/129 |
| 6,393,521 B1 * | 5/2002 | Fujii | 711/119 |
| 6,408,365 B1 * | 6/2002 | Hosomi | 711/144 |
| 7,111,128 B2 * | 9/2006 | Hum et al. | 711/141 |
| 2004/0039879 A1 * | 2/2004 | Gaither | 711/145 |
| 2006/0143404 A1 * | 6/2006 | Chen et al. | 711/141 |

OTHER PUBLICATIONS

Int'l Application No. PCT/US2005/047595 Int'l Search Report & Weritten Opinion mailed Jul. 18, 2006.

* cited by examiner

*Primary Examiner*—Kevin Ellis
*Assistant Examiner*—Matthew Bradley
(74) *Attorney, Agent, or Firm*—Guojun Zhou (57) ABSTRACT

A system and method for the design and operation of a cache system with differing cache location lengths in level one caches is disclosed. In one embodiment, each level one cache may include groups of cache locations of differing length, capable of holding portions of a level two cache line. A state tree may be created from data in a sharing vector. When a request arrives from a level one cache, the level two cache may examine the nodes of the state tree to determine whether the node of the state tree corresponding to the incoming request is already active. The results of this determination may be used to inhibit or permit the concurrent processing of the request.

24 Claims, 8 Drawing Sheets

|   L1 REQUEST FROM REQ. CORE | NO. OF OUTSTANDING L1 RESPONSES |
|---|---|
|  |  |
|  |  |
|  |  |
|  |  |
|  |  |
| 612 | 614 |
|  |  |
|  |  |
|  |  |
|  |  |
|  |  |
|  |  |
|  |  |
|  |  |
|  |  |

L2 LINE ADDRESS → 610

CSHR

FIG. 7B

SYSTEM AND METHOD FOR CACHE COHERENCY IN A CACHE WITH DIFFERENT CACHE LOCATION LENGTHS

The present invention relates generally to microprocessors with data caches, and more specifically to microprocessors that may include data caches with groups of cache locations of differing lengths.

BACKGROUND

Modern microprocessors may include two or more processor cores on a single semiconductor device. Such microprocessors may be called multi-core processors. The use of these multiple cores may improve performance beyond that permitted by using a single core. Each core may include its own level one data and instruction cache, and there may additionally be a level two cache on the device.

In order to enhance performance, the cache locations in the level one data caches may be of a length selected in response to the expected data types. Limitation on device size may permit either a larger number of cache locations of a shorter length, or a smaller number of cache locations of a longer length. When the expected data has great spatial locality (e.g. the data tend to be located in contiguous areas of memory), performance may be enhanced by using a smaller number of cache locations of the longer length. At the other extreme, when the expected data has little spatial locality (e.g. the data may be randomly or pseudo-randomly scattered throughout memory), performance may be enhanced by using a larger number of cache locations of shorter length.

It is possible to design level one data caches with several groups of cache locations, each group containing cache locations of a different length. This may permit enhanced performance across various kinds of expected data. Additionally, a particular piece of data may simultaneously be present in multiple groups of cache locations, again to permit enhanced performance. However, most cache coherency engines operate at the granularity of the cache location/cache line size. For the sake of simplicity these are designed to support a common cache location/cache line size. Therefore a cache coherency engine intended for use with caches of varying cache location length is a design issue, especially when an existing cache coherency protocol would preferably be used without fundamental redesign.

BRIEF DESCRIPTION OF THE DRAWINGS

The present disclosure is illustrated by cache location of example, and not by cache location of limitation, in the figures of the accompanying drawings and in which like reference numerals refer to similar elements and in which.

DETAILED DESCRIPTION

The following description includes techniques for design and coherent operation of data caches having cache locations of differing lengths in a multi-core processor. In the following description, numerous specific details such as logic implementations, software module allocation, bus and other interface signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments, the invention is disclosed in the environment of an Itanium® Processor Family compatible processor (such as those produced by Intel® Corporation) and the associated system and processor firmware. However, the invention may be practiced with other kinds of processor systems, such as with a Pentium® compatible processor system (such as those produced by Intel® Corporation), an X-Scale® family compatible processor, or any of a wide variety of different general-purpose processors from any of the processor architectures of other vendors or designers. Additionally, some embodiments may include or may be special purpose processors, such as graphics, network, image, communications, or any other known or otherwise available type of processor in connection with its firmware.

Figure 1:
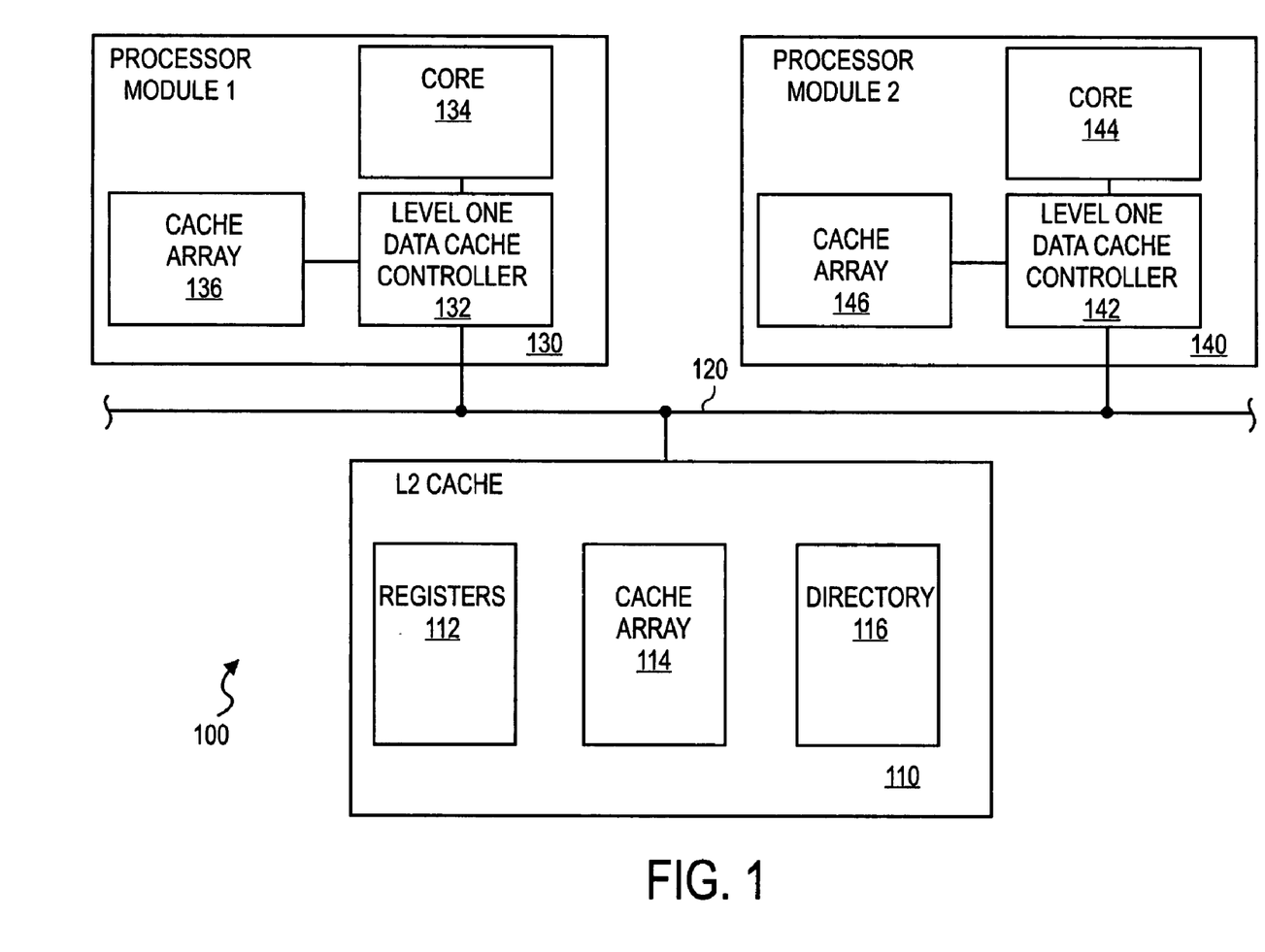
FIG. 1 is a diagram of a processor with multiple processor cores with caches including cache locations of differing lengths, according to one embodiment of the present disclosure.

Referring now to FIG. 1, a diagram of a processor with multiple processor cores with caches, including cache locations of differing lengths, is shown, according to one embodiment of the present disclosure. In one embodiment, processor module 1 130 and processor module 2 140 are shown, but in other embodiments there could be many more processor modules present in a particular overall processor implementation.

Processor module 1 130 and processor module 2 140 may each include a core 134, 144 for program execution, a level one L1(L1) data cache controller 132, 142, and a cache array 136, 146. Here "level one" may indicate a cache that is closest in hierarchical level to the processor core. The cache arrays 132, 142 may include various cache locations capable of holding data brought in from memory as cache lines. These cache locations may vary in length, and may contain portions of cache lines instead of entire cache lines in order to enhance performance.

The processor module 1 130 and processor module 2 140 may be connected via an interconnect 120 to a level two (L2) cache 110. Here "level two" may indicate a cache that is one step removed in hierarchical level to the processor core. The L2 cache 110 may include a cache array 114 including cache locations capable of holding data brought in from memory as cache lines. It may also include a directory 116 to hold tag and status data for cache lines contained in cache array 114 and also in the various L1 caches. Finally, it may include several sets of registers 112 to support cache operations.

Figure 2:
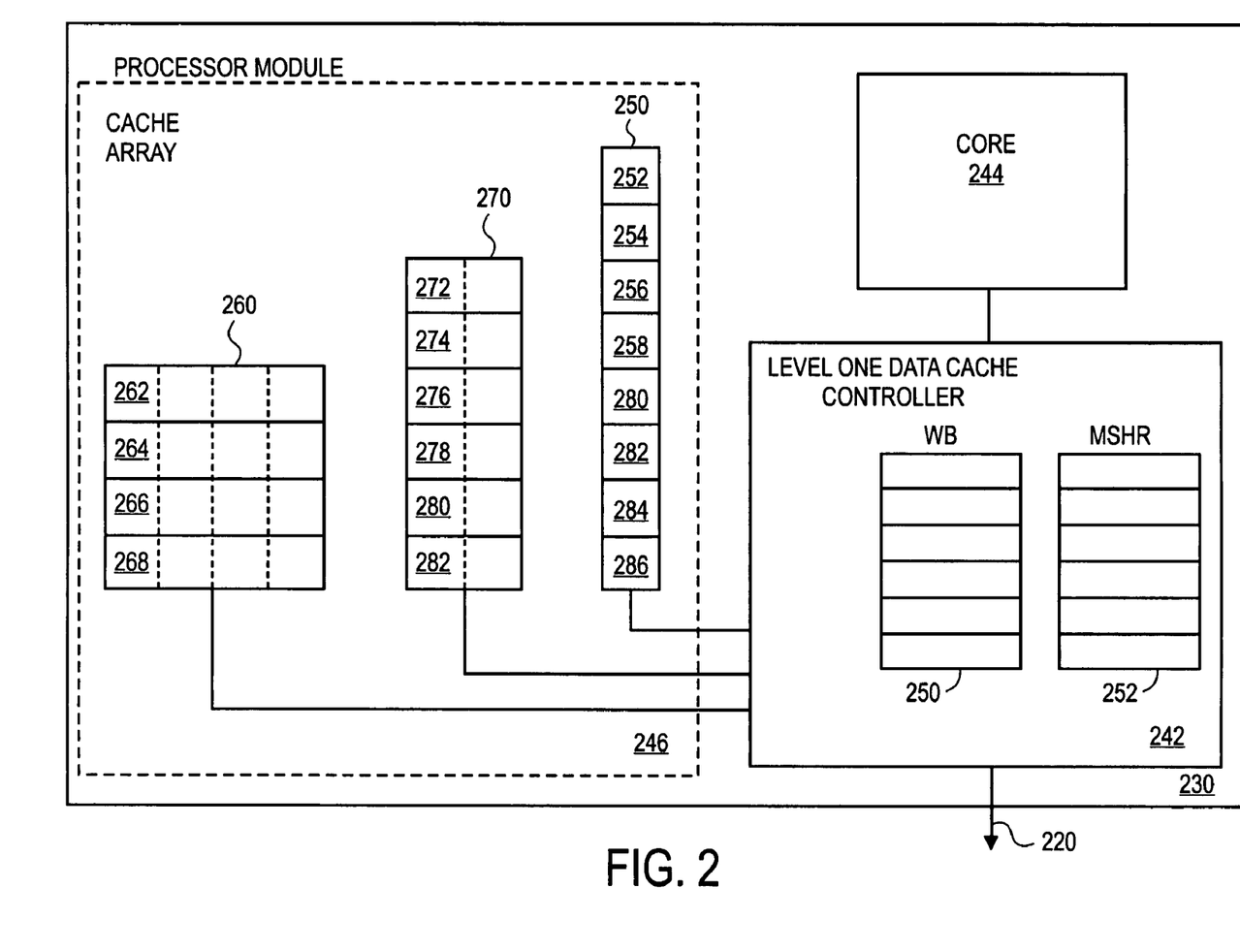
FIG. 2 is a diagram of a processor module, according to one embodiment of the present disclosure.

Referring now to FIG. 2, a diagram of a processor module is shown, according to one embodiment of the present disclosure. Processor module 230 may include the core 244, level one data cache controller 242, and cache array 246 as discussed above in connection with FIG. 1.

Cache array 246 may include groups of cache locations that differ in length. For example, the cache locations in group 260 may hold an entire cache line of the cache hierarchy. However, the cache locations in group 270 may hold portions of the entire cache line, where each portion is only half as long as the entire cache line. Similarly the cache locations in group 250 may hold portions of the entire cache line, where each portion is only one quarter as long as the entire cache line. There may be many embodiments of such a cache array, where differing cache locations may have differing lengths. There may be more or fewer than three kinds of cache locations, and in other embodiments there may be cache locations of lengths that are not necessarily related by powers of two to the entire cache line length of the overall cache hierarchy. In the FIG. 2 embodiment, the cache locations of group 260 may hold the entire cache line, but in other embodiments the cache locations of group 260, the longest cache locations in the cache array 246, may only hold a portion of the entire cache line.

In order to discuss the use of cache array 246, the expression "block" may be useful. Here a block may be defined as the length of the smallest cache location in the coherency of the L1 data cache. Therefore group 250 includes one-block cache locations, group 270 includes two-block cache locations, and group 260 includes four-block cache locations. In other embodiments, cache locations of other block length could be used.

In order to perform as a cache, the groups of cache locations 250, 260, 270 are connected to the level one data cache controller 242. This provides the controller, coherence engine, a miss status holding register (MSHR) 252, a write-back buffer (WB) 250, and an interconnect interface 220. In some embodiments these could be replicated for each group of cache locations 250, 260, 270, but in the present embodiment they may be shared among the cache locations. The L2 cache may be aware of the different groups of cache locations, and may therefore send coherence messages targeted at each of the different groups of cache locations. The level one data cache controller 242 may receive such messages and act upon them, which may entail marking them and interpreting them as being from or to a particular group of cache locations in cache array 246.

The MSHR 252 may be modified in comparison with the traditional MSHRs found in caches having a single cache location length. Traditional MSHRs may buffer multiple memory requests to the same address that was determined to be a miss. Because of the groups of cache locations of differing length, such multiple memory requests to the same address may be directed to cache locations of differing length. Buffering multiple memory requests in the traditional manner may reduce performance. As an example, for those cases where the second request for an address is for a cache location of larger length than that of the first memory request, the results brought back in from the first memory request would not include enough blocks to satisfy the second memory request. Therefore in one embodiment, MSHR 252 may allocate a separate entry for each group of cache locations for whom memory requests to the same address are pending. Each of the memory requests will be sent on to the L2 cache. The separate entries in MSHR 252 may be indexed with both the address and an identifier specifying which group of cache locations the request came from. In this manner, only memory requests to a particular address coming from the same group of cache locations may be buffered behind a first request to that particular address.

Traditionally a WB would be checked upon receipt of an incoming request for an address before a miss would be declared. If the requested address is found in the WB, the incoming request for that address may be buffered and the write-back permitted to complete before continuing on with the request. However, if the write-back entry is from a group of cache locations of length different from that which generated the incoming request, it may be possible to not delay the handling of the miss. In order to support this, in one embodiment WB 250 may be indexed with both the address and an identifier specifying from which kind of group of cache locations the incoming request came.

Figure 3:
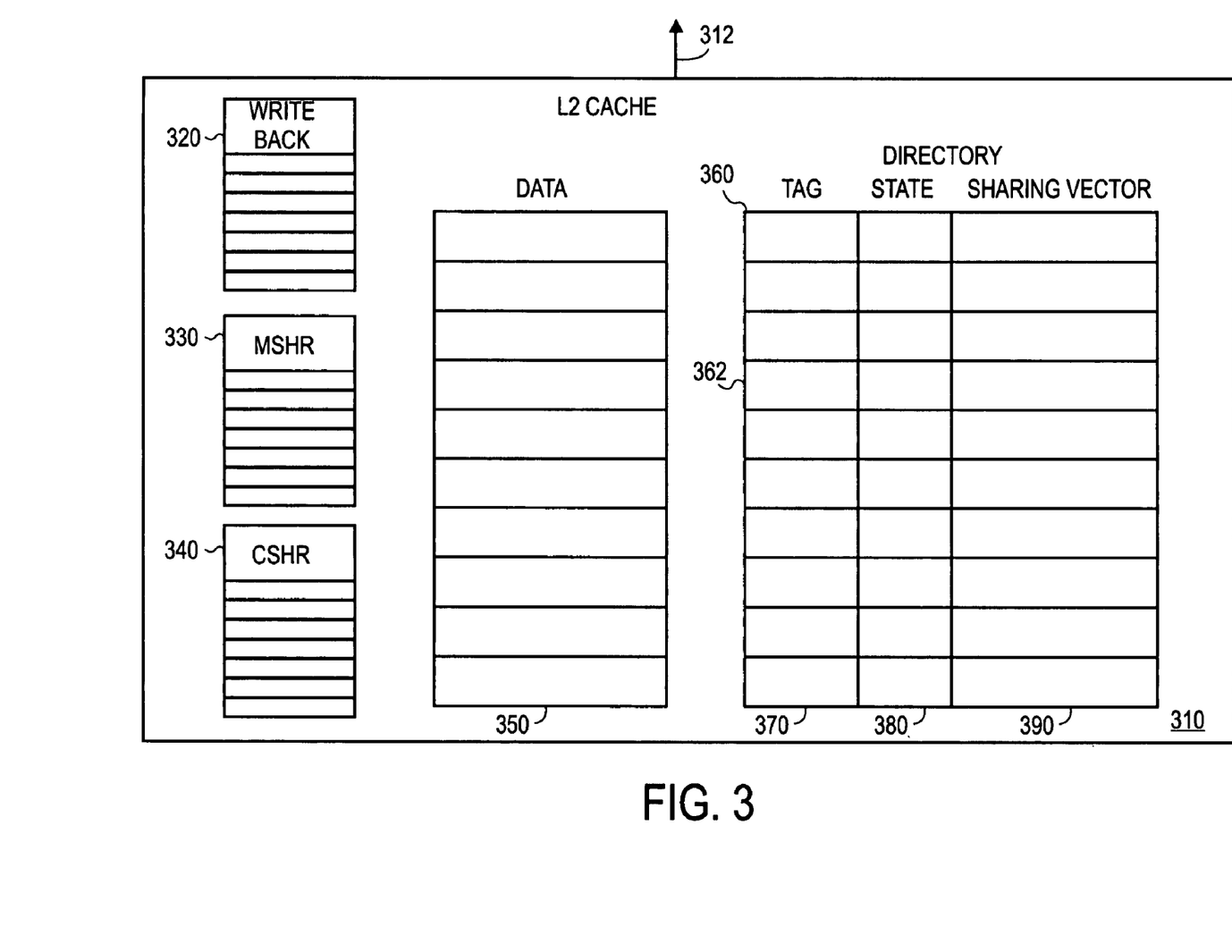
FIG. 3 is a diagram of a level two cache with directory structure, according to one embodiment of the present disclosure.

Referring now to FIG. 3, a diagram of a level two cache with directory structure is shown, according to one embodiment of the present disclosure. The L2 cache 310 may include a number of cache locations for holding data 350 and a directory 360. The directory 360 may include several kinds of entries corresponding to the contents of equivalent cache locations in data 350. These kinds of entries may include tags 370, the cache coherency states 380, and sharing vectors 390. In one embodiment, the states may be the inactive states modified (M), shared (S), or invalid (I) of the MSI cache coherency protocol. In other embodiments, other cache coherency states may be supported.

A sharing vector may include information on all of the L1 data caches within the cache coherency space of L2 cache 310. In particular, a sharing vector may include as many bits per processor core as there are groups of cache locations with differing lengths. In some embodiments, there may be additional bits per group of cache locations to indicate which portion of the entire cache line may be present in a particular L1 data cache. Referring briefly to FIG. 2, such additional bits could indicate whether the two blocks in cache location 272 were from the first or second two blocks of the corresponding entire cache line. Details of one embodiment of an entry 362 in directory 360 are discussed at length below in connection with FIG. 4.

L2 cache 310 may also include several sets of registers. In the FIG. 3 embodiment these may include write-back registers 320, a miss status handling register (MSHR) 330, and a collection status holding register (CSHR) 340. In one embodiment the write-back registers 320 and the MSHR 330 may be of traditional design. CSHR 340 and its utility for collecting updated portions of the entire cache line are discussed at length below in connection with FIG. 6.

Figure 4:
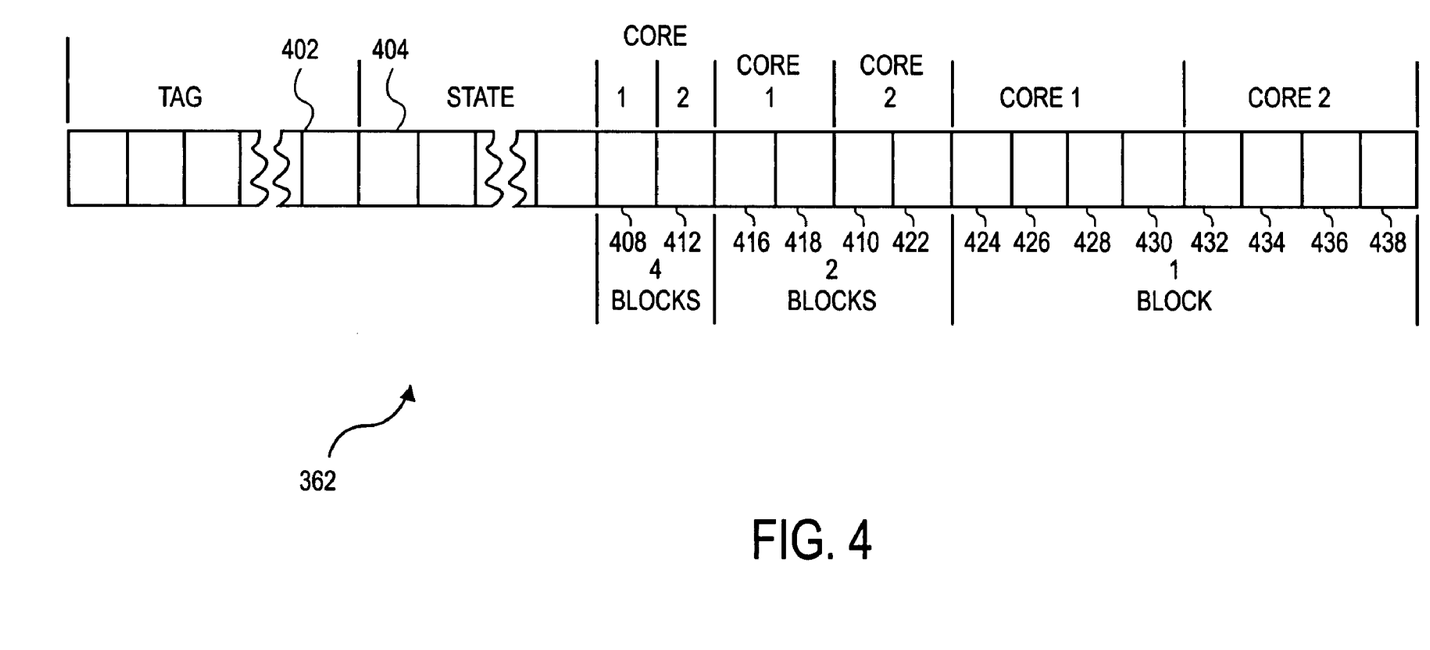
FIG. 4 is a diagram of a directory entry for the level two cache of FIG. 3, according to one embodiment of the present disclosure.

Referring now to FIG. 4, a diagram of a directory entry 362 for the level two cache of FIG. 3 is shown, according to one embodiment of the present disclosure. Entry 362 has allocated bits for a tag 402 for the entire cache line. It also has one or more bits for cache coherency state 404. For each core present and for each possible combination of kind of cache location and portion of the entire cache line that may be present in the data cache of that core, there may be a bit to indicate the presence or absence of that portion of the entire cache line in that kind of cache location.

Consider the processor 100 of FIG. 1, where each processor module may be a processor module 230 of FIG. 2. Then in entry 362 there are two bits 408, 412 representing the groups of cache locations holding four blocks in cores 1, 2, respectively. A single bit may be sufficient since there is only one portion of the entire cache line that may be contained in a four block cache location, namely the entire cache line itself.

For the portion of entry 362 concerning the groups of cache locations holding two blocks, core 1 has two bits 416, 418 and core 2 has two bits 420, 422. Here two bits may be used per core, because the cache locations holding two blocks may hold one of two portions of the entire cache line (e.g. first or second two blocks of the entire cache line). For example, the "one" located in 418 may indicate that the second portion of the entire cache line is present in the two block group of cache locations of core 1.

For the portion of entry 362 concerning the groups of cache locations holding a single block, core 1 has four bits 424-430 and core 2 has four bits 432-438. Here four bits may be used per core, because the cache locations holding one block may hold one of four portions of the entire cache line (e.g. first, second, third, or fourth blocks of the entire cache line). For example, the "one" located in 424 may indicate that the first block portion of the entire cache line is present in the one block group of cache locations of core 1.

In other embodiments, entry 362 may be extended to cover those cases of processors with more than two cores simply by adding bit fields in the appropriate places. It is noteworthy that there is no particular limit imposed upon the number of cores by the design of entry 362. Similarly, in other embodiments entry 362 may be extended to cover those cases of processors with more or fewer than three groups of cache locations with differing lengths simply by adding or deleting bit fields in the appropriate places. The FIG. 4 embodiment shows the bits of entry 362 grouped by the length of the cache locations: however, in other embodiments the bits of an entry could also be organized by the cores.

The previously discussed inactive states of the cache coherency protocol were given in one embodiment as M, S, and I. A coherency operation may cause the transitioning from one of these inactive states to another. When a request for a coherency operation is processed, the coherency operation may cause the state of a cache line to pass through various active states. A rule in traditional cache coherency protocols may be that when a cache line is in an active state, no additional coherency operations may take place.

However, in one embodiment of a cache system of the present disclosure, differing cache locations of the level one data caches may hold different portions of the entire cache line. It may be possible to allow the concurrent processing of requests for coherency operations to occur when the requests are to "independent" portions of the entire cache line. Here independent portions may be the first and second half of the entire cache line, or any pair of the quarters of the entire cache line. Because coherence operations may include the sending of messages and waiting for replies, allowing the concurrent processing of requests may enhance cache performance.

A coherence protocol, performed in L2 cache 310, may receive four different kinds of requests for coherency operations from the processor modules. These may include requests for reads, exclusive reads (e.g. to receive ownership for writes), upgrades, and write-backs. When considering these requests in the context of having groups of cache locations of differing lengths, the requests may wish to consider the state held by the various portions of the entire cache line. In order to efficiently perform this consideration, the bits contained in state bits 404 and sharing vector bits 408-438 may be examined by logic as though they were a state tree.

Figure 5:
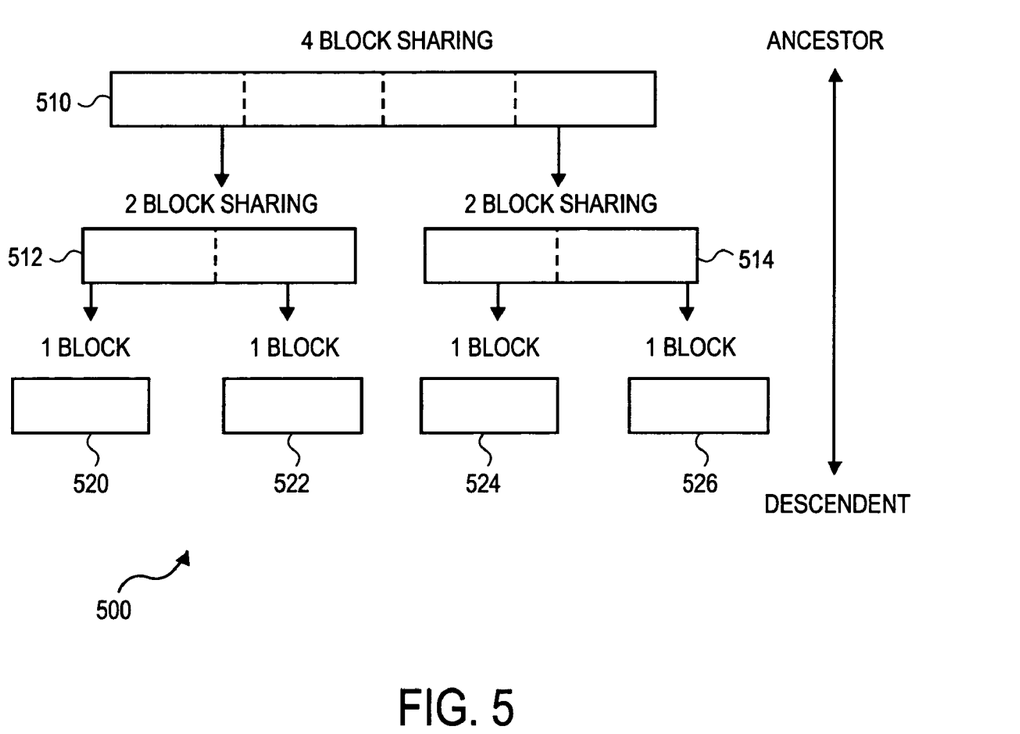
FIG. 5 is a diagram of a state tree corresponding to the directory entry of FIG. 4, according to one embodiment of the present disclosure.

Referring now to FIG. 5, a diagram of a state tree 500 corresponding to the directory entry 362 of FIG. 4 is shown, according to one embodiment of the present disclosure. State tree 500 may be formed from a set of nodes 510, 512, 514, 520, 522, 524, 526. Each node may represent the status of one of the various portions of the entire cache line that may be held in one of the kinds of cache locations present in the various L1 data caches. Logic within L2 cache may put a node into either an inactive state or an active state corresponding to a pending coherency operation.

For example, a root node 510 may represent any inactive or pending active cache coherency state and the portion of the entry 362 showing where the entire cache line may be present in the various L1 data caches (e.g. bits 408, 412). In embodiments where none of the L1 data caches include four block cache locations, root node 510 may omit the portion of entry 362 while retaining the pending active cache coherency state.

Nodes 512, 514 may represent any inactive or pending active cache coherency state and the portion of the entry 362 showing where the first and second half, respectively, of the entire cache line may be present in the various L1 data caches (e.g. bits 416, 420, and 418, 422, respectively). Similarly, nodes 520, 522, 524, and 526 may represent any pending active cache coherency state and the portion of the entry 362 showing where the first quarter, second quarter, third quarter, and fourth quarter, respectively, of the entire cache line may be present in the various L1 data caches (e.g. bits 424, 432; 426, 434; 428, 436; and 430, 438, respectively).

Differing forms of cache coherency protocols may give rise to differing rules for coherence among the nodes of the state tree 500. Using the MSI protocol discussed earlier as an example, differing nodes may be required to have differing states depending upon their location and relative dependencies. For example, if node 514 is in the M state, its ancestor (a node along a branch of the tree towards the root node), root node 510, needs to be in the I state, as do its descendent nodes (nodes along a branch of the tree away from the root node) 524, 526. However, due to the lack of dependencies between node 514 and nodes 512, 520, and 522, the latter nodes may be in any of the MSI states (e.g. a "don't care" state). Similarly if node 526 is in the M state, then nodes 510 and 514 need to be in the I state, but nodes 524, 512, 520, and 522 may be in any of the MSI states due to the lack of dependencies. The root node 510 is different in that all other nodes are dependent from root node 510. In other embodiments of cache coherency protocols, other rules for states among dependent and not-dependent nodes may be used.

The state tree 500 may be used to support the determination of whether a given portion of the entire cache line is currently involved in a coherency operation. Consider that a particular node's ancestors may represent a superset of the data that the node itself represents. And the node's descendents may represent the portions of the entire cache line contained within the portion that the node itself represents. Because of these properties, a simple set of rules may be used to determine whether a portion of the entire cache line represented by a node is currently involved in a coherency operation. These rules may be implemented in logic of the L2 cache that may operate on the entries of the directory.

Rule 1 may be that if a node has an ancestor that is already in an active state, then that node may not begin a new coherency operation. Rule 2 may be that if a node itself is already in an active state, then it may not begin a new coherency operation. Rule 3 may be that if any descendents of the node are already in an active state, then that node may not begin a new coherency operation. Rule 4 may be that if the new coherency operation would modify the state of any ancestor of the node, then Rules 1, 2, and 3 will also be applied to the ancestor closest to the root node. In other embodiments, other sets of rules could be established to determine whether a portion of the entire cache line is currently involved in a coherency operation.

Figure 6:
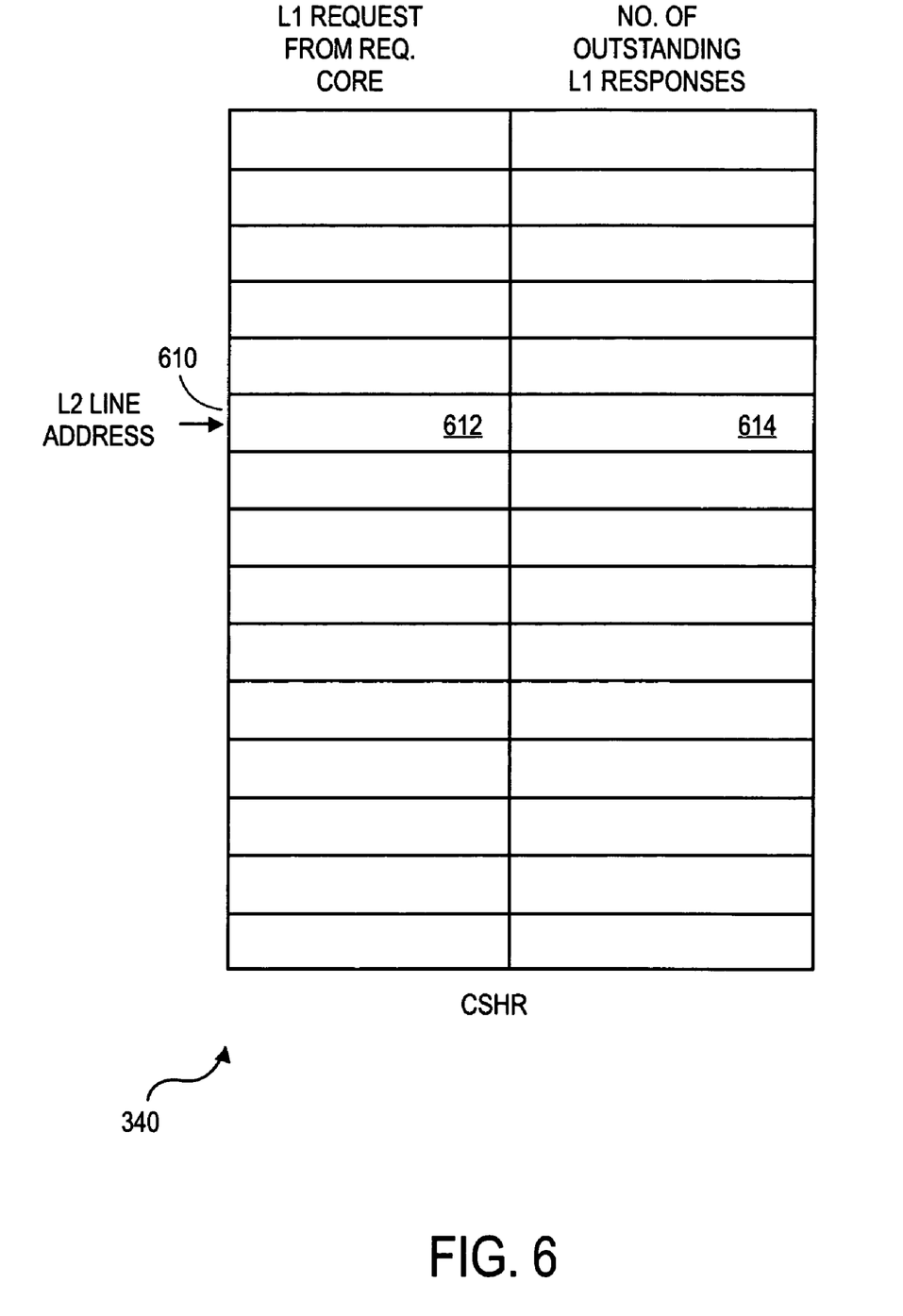
FIG. 6 is a diagram of a collection status holding register, according to another embodiment of the present disclosure.

Referring now to FIG. 6, a diagram of a collection status holding register (CSHR) is shown, according to one embodiment of the present disclosure. In a traditional cache system, when one data L1cache wishes to access a cache line that is owned by another data L1cache, the corresponding L2 cache may update the state of the line and forward the request to the owning data L1 cache. In one embodiment of a cache system with cache locations of differing lengths, the process of updating the state of the line and forwarding the request to the owning data L1 cache may be performed in a similar manner for certain cases. Those cases may include the cases where the owning data L1 cache has the requested portion of the cache line in a cache location which is the same length or longer than the corresponding cache location in the requesting data L1 cache.

However, if the line was modified at a block-granularity smaller than that of the requested block-granularity, then a portion of the requested cache line may be, for example, in a modified state in one data L1 cache and the rest in another data L1 cache (or memory). In situations such as these a need arises to collect and assemble these various portions of the requested cache line. A method for collecting and assembling these various portions of the requested cache line may be performed in several cache locations. In one embodiment, the requesting data L1 cache may collect and assemble the portions itself. This may advantageously decrease the latency of processing the request.

However, in another embodiment it may be expected that sharing of portions of a cache line corresponding to several different nodes in the state tree may be relatively rare. The corresponding need to collect and assemble these various portions of the requesting cache line may therefore also be relatively rare. In this embodiment it may be simpler to perform the collection and assembly in the L2 cache, and later forward the assembled cache line to the requesting level one data cache.

In order to perform the collection and assembly in the L2cache, a CSHR 340 may be used. Each entry in the CSHR 340 may track a particular level one data cache request. The entries may be indexed by the L2 cache line address corresponding to the level one data cache request. Each entry may include the incoming level one data cache request, which may include the length of the cache location for which the request is made and also which particular portion of the entire cache line (e.g. first half, third quarter, etc.) is requested. Each entry may have initially stored the number of requests that the L2cache will make to the various level one data cache caches. This number may be decremented as each response arrives. When the number reaches zero the L2 cache will know that all the portions have been collected, and that the process of assembly may begin.

A request from one of the level one data caches may be processed as follows. When the L2 cache receives the request, it may first determine whether the request is of the same block-granularity as the owning level one data cache. If it is, then the L2 cache may simply forward the request to the owning level one data cache. However if it is not the same block-granularity, then an entry 610 in the CSHR 340 may be allocated. The incoming level one data cache request may be placed into the request field 612 and the number of requests that the L2 cache will make to the various level one data caches may be placed into the number of outstanding responses field 614. Then L2 cache may issue the requests to the various level one data caches and wait for the responses to arrive. As each response arrives at the L2 cache, the corresponding data is held and the number of outstanding responses field 614 may be decremented. When the number of outstanding responses field 614 reaches zero, the L2 cache will know that all the portions have been collected. The L2 cache may then assemble the data received from the level one data caches. Once assembled, the L2 cache may then forward the assembled cache line to the original requesting level one data cache.

Figure 7A:
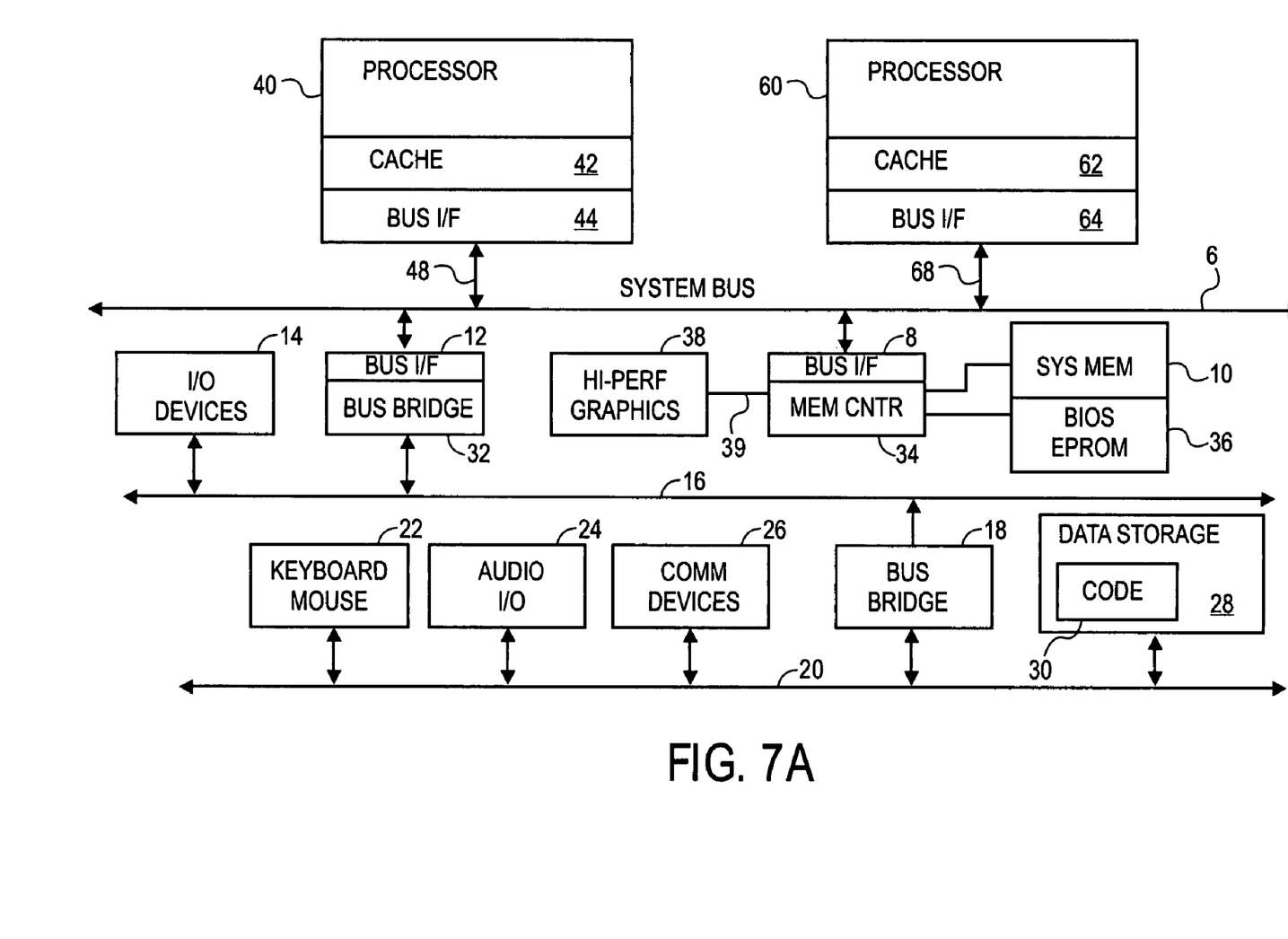
FIG. 7A is a schematic diagram of a system with processors with multiple cores, according to an embodiment of the present disclosure.
Figure 7B:
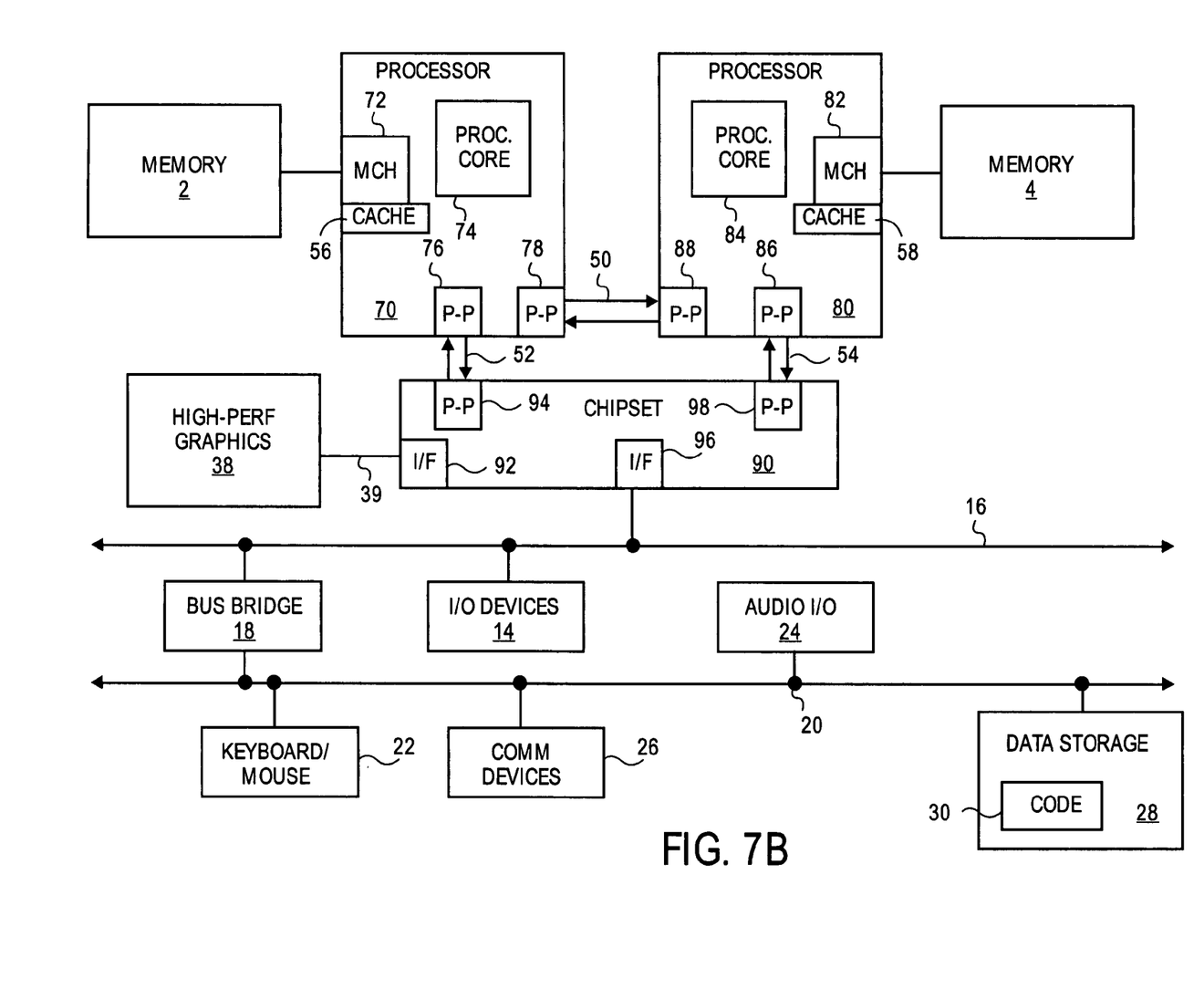
FIG. 7B is a schematic diagram of a system with processors with multiple cores, according to another embodiment of the present disclosure.

Referring now to FIGS. 7A and 7B, schematic diagrams of systems with processors with multiple cores are shown, according to two embodiments of the present disclosure. The FIG. 7A system generally shows a system where processors, memory, and input/output devices are interconnected by a system bus, whereas the FIG. 7B system generally shows a system where processors, memory, and input/output devices are interconnected by a number of point-to-point interfaces.

The FIG. 7A system may include one or several processors, of which only two, processors 40, 60 are here shown for clarity. Processors 40, 60 may include level two caches 42, 62, where each processor 40, 60 may include multiple cores, each with a level one cache. The FIG. 7A system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other busses may be used. In some embodiments memory controller 34 and bus bridge 32 may collectively be referred to as a chipset. In some embodiments, functions of a chipset may be divided among physical chips differently than as shown in the FIG. 7A embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory, and may include other basic operational firmware instead of BIOS. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct data from system memory 10 to the high-performance graphics circuit 38 across high-performance graphics interface 39.

The FIG. 7B system may also include one or several processors, of which only two, processors 70, 80 are shown for clarity. Processors 70, 80 may include level two caches 56, 58, where each processor 70, 80 may include multiple cores, each with a level one cache. Processors 70, 80 may each include a local memory controller hub (MCH) 72, 82 to connect with memory 2, 4. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. In other embodiments, chipset functions may be implemented within the processors 70, 80. Chipset 90 may also exchange data with a high-performance graphics circuit 38 via a high-performance graphics interface 92.

In the FIG. 7A system, bus bridge 32 may permit data exchanges between system bus 6 and bus 16, which may in some embodiments be a industry standard architecture (ISA) bus or a peripheral component interconnect (PCI) bus. In the FIG. 7B system, chipset 90 may exchange data with a bus 16 via a bus interface 96. In either system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor, comprising:
a first core with a first cache including a first group of cache locations of a first length and a second group of cache locations of a second length;
a second cache at a hierarchy level further from said first core than said first cache, with a third group of cache locations of a third length;
a first logic to perform coherency operations, to hold a directory entry of a first cache line in one of said third group of cache locations with fields corresponding to cache lines in said first cache, said directory entry including a vector to represent presence or absence of portions of said first cache line in said first group and said second group of cache locations; and
a second core with a third cache including a fourth group of cache locations of said first length and a fifth group of cache locations of said second length;
wherein said second cache includes a first register group to track requests made to said first cache and said third cache for portions of said first cache line in said first group, second group, fourth group, and fifth group of cache locations.

2. The processor of claim 1, wherein said vector is further to represent presence or absence of portions of said first cache line in said fourth group and said fifth group of cache locations.

3. The processor of claim 2, wherein said first logic to form a state tree from said vector when said first cache requests a memory or cache operation corresponding to a first node of said state tree.

4. The processor of claim 3, wherein said first logic is to delay said coherency operation when said first node is already active.

5. The processor of claim 3, wherein said first logic is to delay said coherency operation when an ancestor of said first node in said state tree is already active.

6. The processor of claim 3, wherein said first logic is to delay said coherency operation when a descendent of said first node in said state tree is already active.

7. The processor of claim 3, wherein said first logic is to implement rules for allowable states of said first node and a second node responsive to a dependency of said first node and said second node.

8. The processor of claim 1, wherein said second cache includes a second logic to assemble said portions to collect a current value of said one of said portion.

9. A method, comprising:
receiving a request for a memory or cache operation from one of a group of first level caches each including cache locations of a first length and cache locations of a second length;
determining in a second level cache which of said cache locations of said first length and said cache locations of said second length include portions of a first cache line of said second level cache corresponding to said request;
delaying said request for said memory or cache operation based in part on results of said determining; and
sending a group of data requests to selected ones of said group of first level caches in which said determining found portions of said first cache line.

10. The method of claim 9, wherein said determining includes examining a vector in a directory.

11. The method of claim 10, wherein said determining further includes constructing a state tree from said vector using logic of said second level cache.

12. The method of claim 11, wherein said determining includes applying rules to ancestors and descendents in said state tree from a node corresponding to said request.

13. The method of claim 9, further comprising tracking said data requests in a register and collecting said portions into a current value of said first cache line.

14. A system, comprising:
a processor including:
a first core with a first cache including a first group of cache locations of a first length and a second group of cache locations of a second length,
a second cache at a hierarchy level further from said first core than said first cache, with a third group of cache locations of a third length,
a first logic to perform coherency operations, to hold a directory entry of a first cache line in one of said third group of cache locations with corresponding fields to cache lines in said first cache, said directory entry including a vector to represent presence or absence of portions of said first cache line in said first group and said second group of cache locations, and
a second core with a third cache including a fourth group of cache locations of said first length and a fifth group of cache locations of said second length.
wherein said second cache includes a first register group to track requests made to said first cache and said third cache for portions of said first cache line in said first group second group,. fourth group, and fifth group of cache locations;
an interconnect to couple said processor to an input/output device; and
a network controller coupled to said processor by said interconnect.

15. The system of claim 14, wherein said vector is further to represent presence or absence of portions of said first cache line in said fourth group and said fifth group of cache locations.

16. The system of claim 15, wherein said first logic to form a state tree from said vector when said first cache requests a coherency operation corresponding to a node of said state tree.

17. The system of claim 16, wherein said first logic is to delay said coherency operation when said node is already active.

18. The system of claim 17, wherein said first logic is to delay said coherency operation when an ancestor of said node in said state tree is already active.

19. The system of claim 18, wherein said first logic is to delay said coherency operation when a descendent of said node in said state tree is already active.

20. An apparatus, comprising:
- means for receiving a request for a memory or cache operation from one of a group of first level caches each including cache locations of a first length and cache locations of a second length;
- means for determining in a second level cache which of said cache locations of said first length and said cache locations of said second length include portions of a first cache line of said second level cache corresponding to said request;
- means for delaying said request for said memory or cache operation based in part on results produced by said means for determining; and
- means for sending a group of data requests to selected ones of said group of first level caches in which said means for determining found portions of said first cache line.

21. The apparatus of claim 20, wherein said means for determining includes means for examining a vector in a directory.

22. The apparatus of claim 21, wherein said means for determining further includes means for constructing a state tree from said vector using logic of said second level cache.

23. The apparatus of claim 22, wherein said means for determining includes means for applying rules to ancestors and descendents in said state tree from a node corresponding to said request.

24. The apparatus claim 20, further comprising means for tracking said data requests in a register and means for collecting said portions into a current value of said first cache line.

* * * * *